(12) United States Patent  
Bonk

(10) Patent No.: US 10,967,862 B2  
(45) Date of Patent: Apr. 6, 2021

(54) ROAD ANOMALY DETECTION FOR AUTONOMOUS VEHICLE

(71) Applicant: UATC, LLC, San Francisco, CA (US)

(72) Inventor: Alyson Bonk, Pittsburgh, PA (US)

(73) Assignee: UATC, LLC, San Francisco, CA (US)

( * ) Notice: Subject to any disclaimer, the term of this patent is extended or adjusted under 35 U.S.C. 154(b) by 213 days.

(21) Appl. No.: 16/181,718

(22) Filed: Nov. 6, 2018

(65) Prior Publication Data

US 2019/0135283 A1 May 9, 2019

Related U.S. Application Data

(60) Provisional application No. 62/582,503, filed on Nov. 7, 2017.

(51) Int. Cl.
| | |
|---|---|
| *B60W 30/18* | (2012.01) |
| *G05D 1/00* | (2006.01) |
| *G05D 1/02* | (2020.01) |
| *G01C 21/34* | (2006.01) |
| *G01C 21/16* | (2006.01) |
| *B60W 40/06* | (2012.01) |

(52) U.S. Cl.
CPC .......... *B60W 30/18* (2013.01); *B60W 40/06* (2013.01); *G01C 21/16* (2013.01); *G01C 21/3453* (2013.01); *G05D 1/0027* (2013.01); *G05D 1/0088* (2013.01); *G05D 1/0231* (2013.01); *B60W 2420/42* (2013.01); *B60W 2420/52* (2013.01); *B60W 2552/00* (2020.02); *B60W 2552/35* (2020.02); *B60W 2720/10* (2013.01)

(58) Field of Classification Search
CPC .. B60W 30/18; B60W 40/06; B60W 2552/00; B60W 2552/35; B60W 2420/42; B60W 2420/52; B60W 2720/10; G01C 21/16; G01C 21/3453; G05D 1/0027; G05D 1/0088; G05D 1/0231
See application file for complete search history.

(56) References Cited

U.S. PATENT DOCUMENTS

| | | | |
|---|---|---|---|
| 3,333,519 A | 8/1967 | Padelt | |
| 4,690,553 A * | 9/1987 | Fukamizu | G01W 1/14 250/341.8 |

(Continued)

FOREIGN PATENT DOCUMENTS

| | | |
|---|---|---|
| EP | 1816514 | 8/2007 |

OTHER PUBLICATIONS

International Search Report issued in PCT/US2014/027126 dated Sep. 5, 2014.

(Continued)

*Primary Examiner* — Calvin Cheung  
(74) *Attorney, Agent, or Firm* — Mahamedi IP Law LLP

(57) ABSTRACT

A computing system can receive sensor log data from one or more first autonomous vehicles (AVs) operating throughout a transport service region, and analyze the sensor log data against a set of road anomaly signatures. Based on analyzing the sensor log data against the set of road anomaly signatures, the computing system may identify road anomalies within the transport service region, and generate a resolution response for each road anomaly. The computing system can then transmit the resolution response to one or more second AVs to cause the one or more second AVs to respond to the road anomaly.

19 Claims, 6 Drawing Sheets

(56) References Cited

U.S. PATENT DOCUMENTS

| | | |
|---|---|---|
| 5,309,522 A | 5/1994 | Dye |
| 5,357,141 A | 10/1994 | Nitschke |
| 7,106,365 B1 | 9/2006 | Sogawa |
| 7,111,996 B2 | 9/2006 | Seger |
| 7,697,727 B2* | 4/2010 | Xu ................. G01C 11/025 382/108 |
| 8,108,119 B2 | 1/2012 | Southall |
| 8,199,975 B2 | 6/2012 | Pomerleau |
| 8,208,716 B2 | 6/2012 | Choi |
| 8,385,630 B2 | 2/2013 | Sizintsev |
| 8,411,145 B2 | 4/2013 | Fardi |
| 8,447,098 B1 | 5/2013 | Cohen |
| 8,611,604 B2 | 12/2013 | Fujiyoshi |
| 8,665,079 B2 | 3/2014 | Pawlicki |
| 9,191,634 B2 | 11/2015 | Schofield |
| 9,196,160 B2 | 11/2015 | Aoki |
| 9,221,396 B1 | 12/2015 | Zhu |
| 9,228,833 B2 | 1/2016 | Zeng |
| 9,247,211 B2 | 1/2016 | Zhang |
| 9,278,689 B1 | 3/2016 | Delp |
| 9,315,151 B2 | 4/2016 | Taylor |
| 9,369,689 B1 | 6/2016 | Tran |
| 9,403,491 B2 | 8/2016 | Happy |
| 9,436,880 B2 | 9/2016 | Bos |
| 9,509,979 B2 | 11/2016 | Livyatan |
| 9,555,736 B2 | 1/2017 | Solar |
| 9,555,803 B2 | 1/2017 | Pawlicki |
| 9,600,768 B1 | 3/2017 | Ferguson |
| 9,604,581 B2 | 3/2017 | Wierich |
| 9,616,896 B1 | 4/2017 | Letwin |
| 9,630,568 B2 | 4/2017 | Kuhn |
| 9,637,053 B2 | 5/2017 | Schofield |
| 9,639,951 B2 | 5/2017 | Salahat |
| 9,643,605 B2 | 5/2017 | Pawlicki |
| 9,665,780 B2 | 5/2017 | Kumano |
| 9,672,446 B1 | 6/2017 | Vallespi-Gonzalez |
| 9,674,490 B2 | 6/2017 | Koravadi |
| 9,707,959 B2 | 7/2017 | Suzuki |
| 9,729,858 B2 | 8/2017 | Livyatan |
| 9,731,653 B2 | 8/2017 | Lynam |
| 9,736,435 B2 | 8/2017 | Schofield |
| 9,740,205 B2 | 8/2017 | Ross |
| 9,744,968 B2 | 8/2017 | Miyano |
| 9,753,542 B2 | 9/2017 | Chizeck |
| 9,772,496 B2 | 9/2017 | Kimura |
| 9,776,568 B2 | 10/2017 | Hoyda |
| 9,779,313 B2 | 10/2017 | Pliefke |
| 9,785,150 B2 | 10/2017 | Sibenac |
| 9,789,880 B2 | 10/2017 | Sweeney |
| 9,863,928 B1* | 1/2018 | Peterson .............. G01N 33/42 |
| 2001/0043738 A1 | 11/2001 | Sawhney |
| 2002/0007119 A1 | 1/2002 | Pelissier |
| 2002/0026281 A1* | 2/2002 | Shibata ............... G08G 1/202 701/29.1 |
| 2005/0185845 A1 | 8/2005 | Luo |
| 2005/0185846 A1 | 8/2005 | Luo |
| 2005/0190972 A1 | 9/2005 | Thomas |
| 2005/0196015 A1 | 9/2005 | Luo |
| 2005/0196035 A1 | 9/2005 | Luo |
| 2005/0246065 A1 | 11/2005 | Ricard |
| 2006/0140510 A1 | 6/2006 | Wallace |
| 2006/0155442 A1 | 7/2006 | Luo |
| 2006/0210146 A1 | 9/2006 | Gu |
| 2006/0221072 A1 | 10/2006 | Se |
| 2007/0031064 A1 | 2/2007 | Zhao |
| 2007/0107573 A1 | 5/2007 | Weusthof et al. |
| 2007/0171037 A1 | 7/2007 | Schofield |
| 2007/0200064 A1 | 8/2007 | Remillard |
| 2007/0219720 A1 | 9/2007 | Trepagnier |
| 2007/0255480 A1 | 11/2007 | Southall |
| 2008/0051957 A1 | 2/2008 | Breed |
| 2008/0055411 A1 | 3/2008 | Lee |
| 2008/0059007 A1* | 3/2008 | Whittaker .............. G08G 1/22 701/2 |
| 2008/0267454 A1 | 10/2008 | Kobayashi |
| 2008/0304705 A1 | 12/2008 | Pomerleau |
| 2009/0153665 A1 | 6/2009 | Linsenmaier |
| 2010/0013615 A1 | 1/2010 | Hebert et al. |
| 2010/0028378 A1 | 2/2010 | Kriveshko |
| 2010/0110192 A1 | 5/2010 | Johnston |
| 2010/0166294 A1 | 7/2010 | Marrion |
| 2010/0182406 A1 | 7/2010 | Benitez |
| 2010/0194890 A1 | 8/2010 | Weller |
| 2010/0208034 A1 | 8/2010 | Chen |
| 2010/0231715 A1 | 9/2010 | Garner |
| 2010/0256836 A1* | 10/2010 | Mudalige ............... G08G 1/164 701/2 |
| 2010/0283837 A1 | 11/2010 | Oohchida |
| 2011/0222757 A1 | 9/2011 | Yeatman, Jr. |
| 2011/0234802 A1 | 9/2011 | Yamada |
| 2011/0301786 A1 | 12/2011 | Allis |
| 2011/0317993 A1 | 12/2011 | Weissler |
| 2012/0083960 A1 | 4/2012 | Zhu |
| 2012/0218411 A1* | 8/2012 | Wu .................... G01N 33/42 348/148 |
| 2012/0293660 A1 | 11/2012 | Murakami |
| 2013/0041508 A1 | 2/2013 | Hu et al. |
| 2013/0090802 A1* | 4/2013 | Curtis ................... G05D 1/024 701/25 |
| 2013/0095920 A1 | 4/2013 | Patiejunas |
| 2013/0123801 A1 | 5/2013 | Umasuthan |
| 2013/0156336 A1 | 6/2013 | Suk |
| 2013/0181983 A1 | 7/2013 | Kitamura |
| 2013/0197736 A1 | 8/2013 | Zhu |
| 2013/0314503 A1 | 11/2013 | Nix |
| 2014/0063233 A1 | 3/2014 | Henion |
| 2014/0071278 A1 | 3/2014 | Assaf |
| 2014/0088855 A1 | 3/2014 | Ferguson |
| 2014/0139669 A1 | 5/2014 | Petrillo |
| 2014/0160295 A1* | 6/2014 | Kyomitsu ............. G08G 1/0112 348/159 |
| 2014/0172296 A1 | 6/2014 | Shtukater |
| 2014/0210947 A1 | 7/2014 | Finn |
| 2014/0267633 A1 | 9/2014 | Venkataraman |
| 2014/0285666 A1 | 9/2014 | O'Connell |
| 2014/0297116 A1 | 10/2014 | Anderson |
| 2014/0327775 A1 | 11/2014 | Cho |
| 2014/0347440 A1 | 11/2014 | Hatcher |
| 2014/0376119 A1 | 12/2014 | Sobecki |
| 2015/0042640 A1 | 2/2015 | Algreatly |
| 2015/0109415 A1 | 4/2015 | Son |
| 2015/0178998 A1* | 6/2015 | Attard .................. G07C 5/008 701/23 |
| 2015/0241226 A1* | 8/2015 | Engelman ............ G05D 1/0088 701/25 |
| 2015/0248131 A1* | 9/2015 | Fairfield ............. G05D 1/0038 701/2 |
| 2015/0253775 A1 | 9/2015 | Jacobus |
| 2015/0269737 A1 | 9/2015 | Lam |
| 2015/0312552 A1 | 10/2015 | Lu |
| 2015/0330911 A1* | 11/2015 | Howard ................. B60R 1/00 348/128 |
| 2015/0358540 A1 | 12/2015 | Kanter |
| 2016/0009276 A1* | 1/2016 | Moeller ................ B60W 50/14 701/41 |
| 2016/0129838 A1 | 5/2016 | Mingo |
| 2016/0132705 A1 | 5/2016 | Kovarik |
| 2016/0212409 A1 | 7/2016 | Cole |
| 2016/0224856 A1 | 8/2016 | Park |
| 2016/0379411 A1 | 12/2016 | Harbach |
| 2017/0248953 A1* | 8/2017 | Kelley ................. B60W 50/08 |
| 2017/0254886 A1 | 9/2017 | Kyrtsos |
| 2017/0256040 A1 | 9/2017 | Grauer |
| 2017/0344004 A1 | 11/2017 | Foster |
| 2017/0359561 A1 | 12/2017 | Vallespi-Gonzalez |
| 2017/0366795 A1 | 12/2017 | Chou |
| 2018/0007345 A1 | 1/2018 | Bougnoux |
| 2018/0040090 A1* | 2/2018 | Troemel, Jr. ........... G08G 1/127 |
| 2018/0060970 A1* | 3/2018 | Oduor .................. B60W 50/14 |
| 2018/0070804 A1 | 3/2018 | Tesar |
| 2018/0218596 A1* | 8/2018 | Castelli ............... G08G 1/096844 |

(56) References Cited

U.S. PATENT DOCUMENTS

2019/0011921 A1   1/2019  Wang
2019/0135283 A1   5/2019  Bonk
2019/0294167 A1*  9/2019  Kutila ............... B60W 30/0956

OTHER PUBLICATIONS

International Preliminary Report on Patentability issued in PCT/US2014/027126 dated Sep. 24, 2015.
First Office Action dated Dec. 15, 2016 in CN 201480022190.5.
Office Action dated Jan. 16, 2017 in CA 2,902,430.
Office Action dated Sep. 26, 2018 in CN 201480022190.5.
Office Action dated Nov. 6, 2018 in CA 2,902,430.

* cited by examiner

ROAD ANOMALY DETECTION FOR AUTONOMOUS VEHICLE

CROSS-REFERENCE TO RELATED APPLICATION

This application claims the benefit of priority to U.S. Provisional Patent Application No. 62/582,503, entitled "Road Anomaly Detection for Autonomous Vehicles," filed on Nov. 7, 2017; which is hereby incorporated by reference in its entirety.

BACKGROUND

Autonomous vehicles (AVs) can operate on public roads and highways with little or no human intervention. However, certain circumstances can cause misalignment and/or damage to the AV's drive systems, or cause the AV to drop out of autonomous mode, such as a high acceleration event (e.g., striking a road bump or pothole). For example, unmapped potholes can result high acceleration events registered by the AV's sensors, which can cause a control system of the AV to transition from an autonomy mode—in which the control system autonomously operates the drive systems of the AV—to a safety mode or manual drive mode, in which the AV awaits assistance from a human operator or hand over control to a driver.

BRIEF DESCRIPTION OF THE DRAWINGS

The disclosure herein is illustrated by way of example, and not by way of limitation, in the figures of the accompanying drawings in which like reference numerals refer to similar elements, and in which.

DETAILED DESCRIPTION

Figure 1:
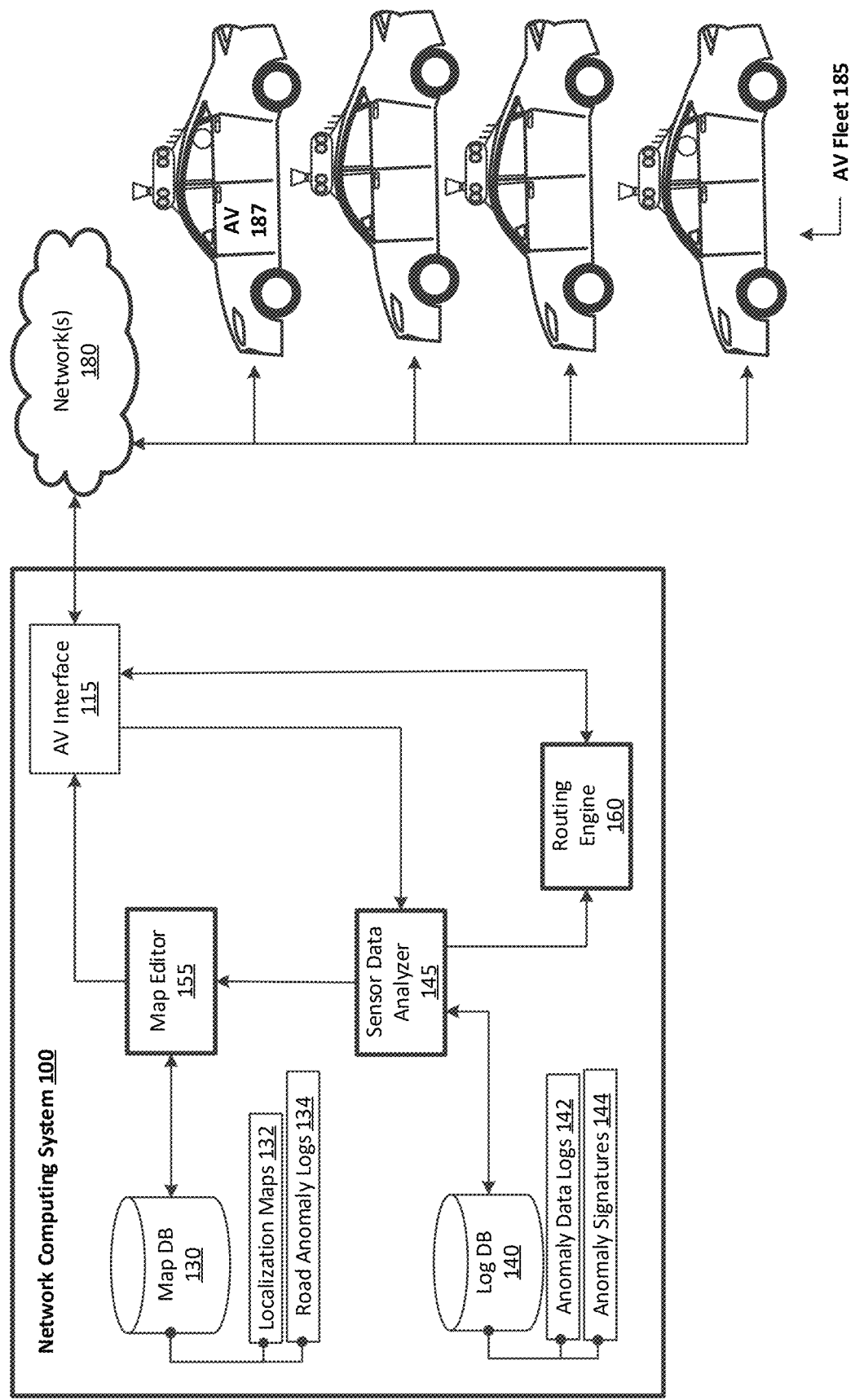
FIG. 1 is a block diagram illustrating an example network computing system in communication with a fleet of autonomous vehicles, in accordance with examples described herein.

A network computing system can coordinate on-demand transportation of autonomous vehicles (AVs) operating throughout a transport service region. In various examples, the network computing system can store or manage a set of ground-truth localization maps that provide detailed surface-level data of the transport service region. In certain implementations, the localization maps may be recorded, processed, and labeled for use by the AVs throughout the transport service region by dynamically comparing a current localization map (e.g., for a current road segment on which the AV is traveling) with real-time sensor data from on-board sensor systems on the AV (e.g., LIDAR, radar, camera, Infrared sensors, etc.). For example, the localization maps can be labeled to indicate the locations of road signs, traffic signals, localization markers (e.g., a tall tower or tree), lanes, static objects (e.g., parking meters, buildings, trees, road barriers, etc.), and the like.

According to examples described herein, the network computing system can receive sensor log data from autonomous vehicles (AVs) operating throughout a transport service region, and analyze the sensor log data against a set of road anomaly signatures. Based on analyzing the sensor log data against the set of road anomaly signatures, the network computing system can identify road anomalies within the transport service region. For each road anomaly, the network computing system can generate a resolution response for the road anomaly, and transmit the resolution response to a subset of the AVs to cause the subset of AVs to preemptively respond to the road anomaly.

Road anomalies as described herein can include potholes, road bumps, road gutters, rail tracks, road cracks, road depressions, and the like. In the field of autonomous vehicle operation, such road anomalies can cause issues with autonomous operation, such as causing autonomous control systems to prematurely shut down due to acceleration tolerances being exceeded. For example, a deep pothole can cause the autonomous control system of an AV to switch to a standby mode, a backup mode, or to pull over and power down due to a default assessment that the AV has experienced a collision. Examples described herein achieve a technical effect of preventing or preempting unnecessary autonomy shutdown due to road anomalies.

As provided herein, the road anomaly signatures can comprise accelerometer data signatures that correspond to a variety of road anomalies being impacted at varying speeds. In certain implementations, the sensor log data can include the AVs instantaneous velocity upon impacting a particular road anomaly. Based on the velocity of the AV and the accelerometer data, the network computing system can determine whether the sensor log data matches any of the road anomaly signatures, or can further determine whether the acceleration signature exceeds an acceleration threshold (e.g., a threshold at which autonomy mode is dropped). If so, the network computing system can classify the road anomaly accordingly. For example, the road anomaly may be classified as rail tracks, a shallow, medium, to deep pothole, a light, moderate, or significant road crack or depression, and the like. Based on the classified road anomaly, the network computing system can generate a suitable resolution response for the AVs.

In certain implementations, the sensor log data can further include image data and/or LIDAR data that can provide the network computing system with added context concerning the road anomaly. For example, the LIDAR and/or image data may be analyzed by the network computing system to determine a precise location of the road anomaly on an underlying road, and to further aid in classifying the road anomaly. In further examples, the sensor log data can include position data and time stamps to further enable the network computing system to pinpoint the location of the road anomaly within the transport service region.

In various aspects, upon identifying and classifying the road anomaly, the network computing system can generate a resolution response that enables AVs to preemptively address the road anomaly. For example, the resolution response can comprise a targeted label on an updated localization map indicating the road anomaly. In such an example, the network computing system can transmit the updated localization map to the subset of AVs such that the updated localization map is configured to replace a corresponding stale localization map that does not include the targeted label.

In variations, the resolution response can comprise a routing instruction causing AVs to reroute around the road anomaly. For example, the network computing system can identify a subset of AVs based on current routes being traveled by the subset of AVs converging towards the road anomaly. For each AV on a route that will intersect with the road anomaly, the network computing system can transmit a routing instruction that causes the AV to adjust a lane position to avoid the road anomaly, select an alternate lane to avoid the road anomaly, and/or execute a detour to avoid the road anomaly. In certain examples, the network computing system can be provided with added context of the individual AVs, such as the make model, year, type (e.g., car, truck, SUV, van, etc.), suspension modifications, tires, service record, whether the AV contains passengers (e.g., has an on-trip status), and the like. Accordingly, the resolution responses may be individually tailored to individual AVs based on the AV's characteristics.

In various aspects, the network computing system can generate the resolution response as a control instruction that causes the AV to adjust its speed when approaching the road anomaly. For example, the control instruction can command the AV to slow to a specified speed (e.g., five meters per second) at a threshold distance prior to intersecting with the road anomaly (e.g., fifty meters prior). In certain examples, the network computing system can instruct AVs that are to intersect with the road anomaly to switch each into a teleassistance mode at a threshold distance from the road anomaly.

For example, it is contemplated that certain types of vehicles (e.g., trucks) can readily surmount road anomalies without experiencing the same accelerations as other vehicles (e.g., sporty cars with stiff suspension). The teleassistance mode can cause a control link to a remote human operator, who can select a motion plan to overcome the road anomaly. The motion plan can comprise any of the resolution responses described herein, such as a position adjustment, lane selection, an ignore command, a detour, a speed adjustment, and the like. Furthermore, a remote human teleassistance operator can be provided with individual vehicle context, such as described above, and can select motion plans based on the individual characteristics of the AV.

As used herein, a computing device refers to devices corresponding to desktop computers, cellular devices or smartphones, personal digital assistants (PDAs), laptop computers, virtual reality (VR) or augmented reality (AR) headsets, tablet devices, television (IP Television), etc., that can provide network connectivity and processing resources for communicating with the system over a network. A computing device can also correspond to custom hardware, in-vehicle devices, or on-board computers, etc. The computing device can also operate a designated application configured to communicate with the network service.

One or more examples described herein provide that methods, techniques, and actions performed by a computing device are performed programmatically, or as a computer-implemented method. Programmatically, as used herein, means through the use of code or computer-executable instructions. These instructions can be stored in one or more memory resources of the computing device. A programmatically performed step may or may not be automatic.

One or more examples described herein can be implemented using programmatic modules, engines, or components. A programmatic module, engine, or component can include a program, a sub-routine, a portion of a program, or a software component or a hardware component capable of performing one or more stated tasks or functions. As used herein, a module or component can exist on a hardware component independently of other modules or components. Alternatively, a module or component can be a shared element or process of other modules, programs or machines.

Some examples described herein can generally require the use of computing devices, including processing and memory resources. For example, one or more examples described herein may be implemented, in whole or in part, on computing devices such as servers, desktop computers, cellular or smartphones, personal digital assistants (e.g., PDAs), laptop computers, VR or AR devices, printers, digital picture frames, network equipment (e.g., routers) and tablet devices. Memory, processing, and network resources may all be used in connection with the establishment, use, or performance of any example described herein (including with the performance of any method or with the implementation of any system).

Furthermore, one or more examples described herein may be implemented through the use of instructions that are executable by one or more processors. These instructions may be carried on a computer-readable medium. Machines shown or described with figures below provide examples of processing resources and computer-readable mediums on which instructions for implementing examples disclosed herein can be carried and/or executed. In particular, the numerous machines shown with examples of the invention include processors and various forms of memory for holding data and instructions. Examples of computer-readable mediums include permanent memory storage devices, such as hard drives on personal computers or servers. Other examples of computer storage mediums include portable storage units, such as CD or DVD units, flash memory (such as carried on smartphones, multifunctional devices or tablets), and magnetic memory. Computers, terminals, network enabled devices (e.g., mobile devices, such as cell phones) are all examples of machines and devices that utilize processors, memory, and instructions stored on computer-readable mediums. Additionally, examples may be implemented in the form of computer-programs, or a computer usable carrier medium capable of carrying such a program.

Some examples are referenced herein in context of an autonomous vehicle (AV) or self-driving vehicle (SDV). An AV or SDV refers to any vehicle which is operated in a state of automation with respect to steering and propulsion. Different levels of autonomy may exist with respect to AVs. For example, some vehicles may enable automation in limited scenarios, such as on highways, provided that drivers are present in the vehicle. More advanced AVs can drive without any human assistance from within or external to the vehicle. Such vehicles are often required to make advanced determinations regarding how the vehicle behaves given challenging surroundings of the vehicle environment.

System Description

FIG. 1 is a block diagram illustrating an example network computing system in communication with a fleet of AVs, in accordance with examples described herein. The network computing system 100 includes an AV interface 115 to communication with the fleet of AVs 185 of one or more networks 180. The network computing system 100 further includes a routing engine 160, a sensor data analyzer 145, and a localization map editor 155. The localization map editor 155 can access a map database 130 comprising localization maps 132 for the transport service region, and can input road anomalies into a road anomaly log 134, locating and classifying road anomalies on the localization maps 132. The sensor data analyzer 145 can access a log database 140 that includes sensor data logs 142 of AVs 185 operating throughout the region, and can compare the log data to road anomaly sensor signatures 144 to classify road anomalies accordingly.

According to various examples, the routing engine 160 of the network computing system 100 can route AVs 187 of the AV fleet 185 throughout a transport service region. For example, the routing engine 160 can match the individual AVs 187 to transport requests corresponding to on-demand passenger, package, or comestible goods transport for requesting users. In various implementations, the routing engine 160 can provide real-time route updates to AVs based on detected road anomalies, and further based on the nature of the road anomalies as determined by the sensor data analyzer 145.

In some aspects, the routing engine 160 can receive location data from each AV 187 of the fleet 185, and dynamically track the AVs 187 as they travel throughout the transport service region. Additionally or alternatively, the routing engine 160 can monitor each given route that each AV 187 currently follows. For example, the AVs 187 may be directed to follow specific routes coordinated by the routing engine 160 to each sequential destination (e.g., pick-up and drop-off locations).

The sensor data analyzer 145 can receive sensor log data from each AV 187 in the fleet 185. In certain aspects, the sensor log data can include inertial measurement unit (IMU) data comprising accelerometer, gyroscopic, and/or magnetometer data, which the sensor data analyzer 145 can process to, for example, determine acceleration forces experienced by the AV 187. In certain implementations, the sensor data analyzer 145 can access and/or manage a log database 140 comprising a set of road anomaly sensor data signatures 144 that classify various road anomalies experienced by the AVs 187. In some aspects, the data logs received from the AVs 187 can further include image data and or LIDAR data. The sensor data analyzer 145 can further process these data to determine and classify road anomaly identified in, for example, and accelerometer data signature from the AV 187.

In many examples, the sensor data analyzer 145 can be triggered to process the log data from the AV 187 based on a detected acceleration event by the AV 187. For example, the trigger can correspond to an AV 187 experiencing an acceleration event that is large enough to cause a control system of the AV 187 to drop out of autonomous control and/or enter a safety mode. In certain implementations, the AV 187 can operate in autonomous mode in accordance with a set of constraints. In one example, the set of constraints can comprise certainty thresholds for object detection and classification. In such examples, the AV 187 can continue to operate in autonomous mode on the condition that each detected object (e.g., pedestrians, bicyclists, other vehicles, and other objects of interest) are accurately classified (e.g., with a certainty above a 98% confidence threshold).

Additionally or alternatively, the set of constraints can include a force threshold that, when exceeded, causes the control system of the autonomous vehicle to enter a safety mode (e.g., hand over manual control of the AV 187 to an on-board safety operator or passenger). For example, the control system of the AV 187 can monitor accelerometer data from an on-board IMU, and if an acceleration threshold is exceeded (e.g., indicating a collision), the AV 187 can, for example, enter the safety mode or request remote network-based assistance (e.g., from a human teleassistance operator). However, it is contemplated that the force threshold may be exceeded for non-collision events that, if identified or diagnosed properly, can be bypassed by the network computing system 100.

The log data from the AV 187 can include time stamps, which the sensor data analyzer 145 can utilize to correlate an experienced acceleration event (e.g., the AV 187 impacting a pothole) with a location along a route on which the AV 187 follows. In certain implementations, the sensor data analyzer 145 can readily identify and classify the road anomaly based solely on the accelerometer data signature. In variations, the sensor data analyzer 145 can correlate the accelerometer data signature of the road anomaly with LIDAR and or image data to identify and classify the road anomaly (e.g., as rail tracks, a pothole, a road gutter, a road crack, a road dip, and the like).

According to various implementations, the sensor data analyzer 145 can further compile snippets of sensor log data from AVs 187 into the anomaly data logs 142 to correlate similar road anomaly sensor data signatures for classification. For example, the sensor data analyzer 145 can classify potholes into sub-groups based on overall size, volume, radius, and/or depth, and can further attach an appropriate resolution response (e.g., in metadata) for AVs 187 approaching each sub-group of potholes. As described herein, such resolution responses can comprise ignoring a road anomaly, adjusting a speed, changing a lane position, changing a lane, taking a detour, or performing an avoidance maneuver.

According certain aspects, when a new road anomaly is experienced by an AV 187, the sensor data analyzer 145 can compare the sensor log data from the AV 187 with the road anomaly signatures 144 to determine whether the sensor log data matches any of the anomaly signatures 144. If so, the sensor data analyzer 145 can store the log sensor data from the AV 187 that identifies the road anomaly as another data point for classifying road anomalies. In further examples, the sensor data analyzer 145 can parse through image and/or LIDAR data in the sensor log data from the AV 187 to confirm whether the road anomaly was classified correctly.

In various examples, once a road anomaly is identified and classified, the sensor data analyzer 145 can determine a suitable resolution response for all other AVs of the fleet 185 that will intersect with the road anomaly. Depending on the nature of the anomaly and the surrounding area of the anomaly, the sensor data analyzer 145 can trigger the map editor 155 and/or the routing engine 160 to generate the suitable resolution response. In certain aspects, the type of resolution response may be based on a set of anomaly factors, such as whether the road anomaly can be safely ignored (e.g., for rail tracks), surmounted or impacted at reduced speed (e.g., shallow potholes and gutters), or should be avoided (e.g., deep potholes).

In accordance with certain implementations, the anomaly signatures 144 defining road anomaly types and classifications can further be associated with a suitable resolution response (e.g., in metadata). Additionally, each road anomaly may be associated with a specified location. For example, a deep pothole may be associated with a specific road segment, lane, and lane location that is accurate on the order of centimeters.

In certain implementations, the sensor data analyzer 145 can trigger the map editor 155 to edit or otherwise append a relevant localization map 132 in the map database 130 to indicate any given road anomaly. As described herein, the AV fleet 185 can utilize a set of on-board or remotely accessed localization maps 132 to dynamically compare ground truth data recorded by on-board sensor systems with a corresponding localization map 132 of a road segment on which the AV 187 currently traverses. The current localization map 132 can include static objects (e.g., fire hydrants, parking meters, trees, buildings, etc.), and static labelled objects of interests (e.g., traffic signals, road signs, localization markers, crosswalks, bicycle lanes, lane divider markings, etc.). Accordingly, the dynamic comparison by the control system of the AV 187 can reveal any dynamic objects of interest, such as other vehicles, pedestrians, bicyclists, and the like, on which the control system can perform object classification and trajectory prediction operations in order to safely traverse the road segment.

In various examples, a given localization map 132 can become stale due to, for example, road construction or alterations to lane markings. The map editor 155 can receive triggers from the sensor data analyzer 145 to append rules or constraints to a stale localization map. For example, the map editor 155 can establish a rule for the AV fleet 185 to avoid a particular road segment due to stale data in the localization map 132 that corresponds to that road segment. In certain aspects, an AV 187 or specialized recording vehicle can be directed to traverse the road segment corresponding to the stale localization map to record fresh data for the road segment. In further aspects, the recorded data may be processed, labeled, and distributed to the AV fleet 185 as a refreshed and up-to-date localization map 132 for the road segment. Thereafter, the AVs in the fleet can freely traverse the road segment using the refreshed localization map.

In further examples, the map editor 155 can establish metadata rules for AVs 187 traversing a particular road segment. For example, the road segment may be adjacent to a park or school frequented by children. Accordingly, the map editor 155 can establish a rule for the AVs 187 to exercise increased caution, or to operate at a slower speed than a posted speed limit to avoid any potential harmful outcomes.

The map editor 155 can store data indicating each detected road anomaly in road anomaly logs 134 (e.g., the specific location and resolution response rules for each road anomaly) for monitoring and tracking each road anomaly. For example, the road anomaly logs 134 may be updated when a particular road anomaly is resolved (e.g., via road construction) or evolves (e.g., a road crack becoming wider or more dangerous). In certain examples, the sensor data analyzer 145 can process senor log data from an AV 187 experiencing a particular road anomaly has been resolved, and can trigger the map editor 155 to edit a corresponding localization map 132 with metadata indicating that the road anomaly has been resolved.

In variations, an evolving road anomaly may be updated in the anomaly logs 134 based on sensor data readings from AVs 187 impacting or otherwise running over or surmounting a particular road anomaly. Based on the evolution of the road anomaly, the sensor data analyzer 145 can also update the resolution response to the evolved road anomaly. For example, the resolution response for a size-increasing pothole can change, such as ignoring, adjusting speed, adjusting a lane position, and taking a detour around the road anomaly.

In certain implementations, the routing engine 160 can track the routes of each AV 187 of the fleet 185 throughout the transport service region. In an addition or an alternative to the functions of the map editor 155, the routing engine 160 may receive road anomaly triggers from the sensor data analyzer 145, indicating the locations, classifications, and resolution responses for each road anomaly in the transport service region. In various examples, the resolution responses may be hierarchically organized based on the classification of the road anomaly. For example, certain minor road anomalies, such as rail tracks may be ignored. Intermediate road anomalies, such as road bumps, gutters, and cracks, may be treated with speed adjustments as resolution responses. More serious road anomalies (e.g., anomalies that can affect the vehicle's alignment, cause tires damage, or cause an AV 187 to drop out of autonomous mode) may be treated with lane changes, lane position adjustments, or route detours to avoid impacting the anomaly.

For each resolution response for each road anomaly, the routing engine 160 can dynamically instruct AVs 187 that are currently on routes that will cause the AVs 187 to potentially intersect or otherwise impact a road anomaly, to perform the resolution response associated with the road anomaly. For example, the routing engine 160 can determine that AV 187 is on a current route that will cause a potential impact of a moderately sized pothole positioned on a right-side tire track of a road lane. If the road has multiple unidirectional lanes in the direction of the AV's 187 trajectory, the routing engine 160 can transmit an instruction for the AV 187 to change lanes prior to converging upon the pothole. If the road has only a single unidirectional lane, the routing engine 160 can transmit an instruction to adjust a lane position such that the pothole passes underneath the AV 187, avoiding an impact with the right-side tires.

In certain examples, the road anomaly can encompass a certain width of a lane that makes impact avoidance impracticable, such as a rough road in general, or large road cracks, potholes, or combinations of the same. For such major road anomalies, the routing engine 160 can determine one or more detours to enable a converging AV 187 to avoid the road anomaly. In such examples, the routing engine can preemptively cause AVs 187 to avoid the major road anomaly by routing the AVs 187 to avoid the road anomaly despite a longer estimated time of arrival to a current destination. In variations (e.g., for AVs making autonomous routing decisions), the routing engine 160 can dynamically instruct the AVs 187 to take a detour or alternative route to avoid the road anomaly.

Accordingly, examples described herein can achieve a technical effect of coordinating, over one or more networks 180, a fleet of AVs 185 to preemptively respond to road anomalies in a hierarchical manner depending on a classification or severity of the anomaly. Such a technical solution to an observed problem in the field of autonomous vehicle routing can result in fewer autonomy drop-out events by AVs impacting road anomalies, and can further prevent such impacts causing potentially dangerous conditions, such as misalignment, tire failures, axle damage, and the like.

Autonomous Vehicle

Figure 2:
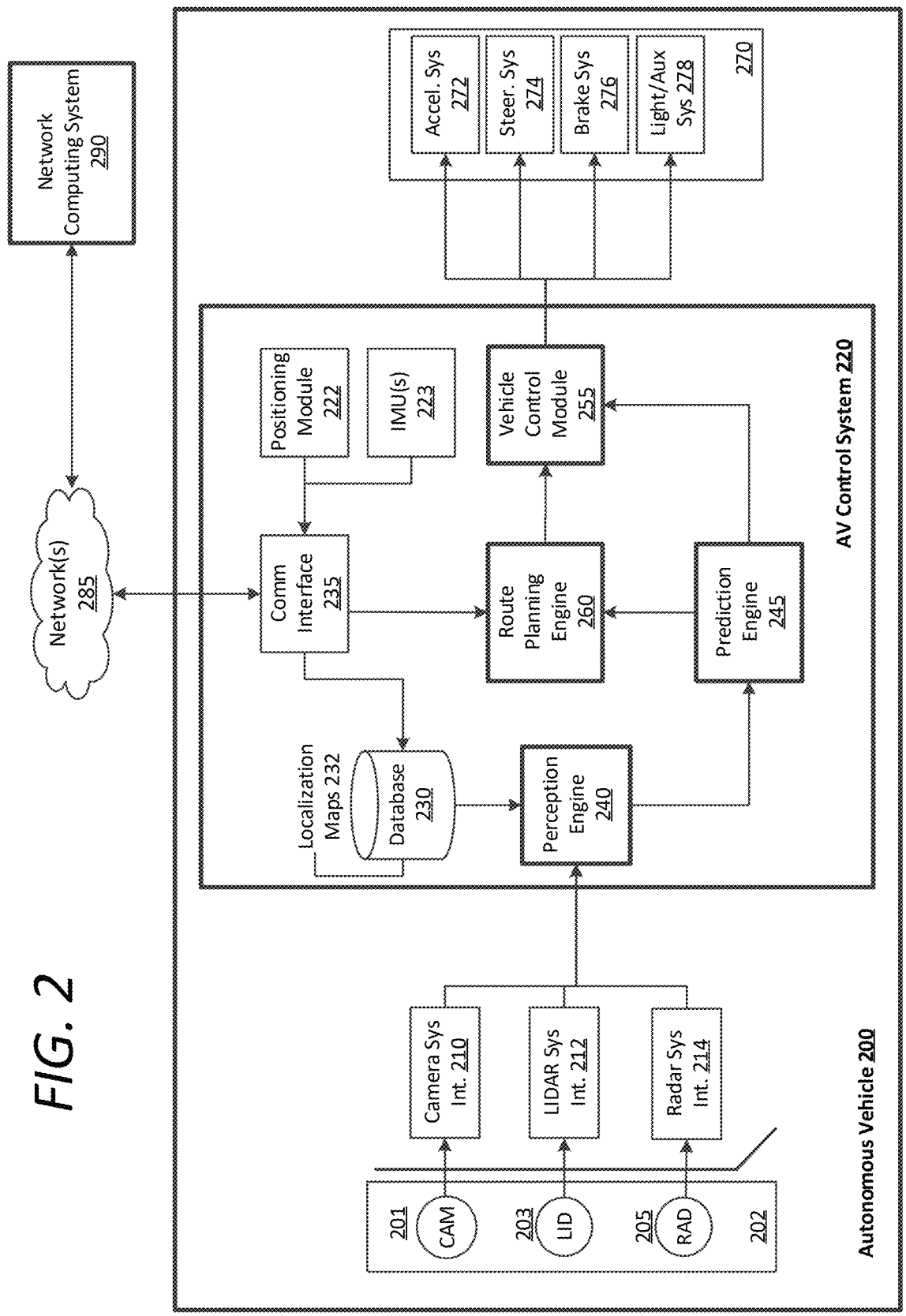
FIG. 2 is a block diagram illustrating an example autonomous vehicle implementing a control system, according to examples described herein.

FIG. 2 is a block diagram illustrating an example autonomous vehicle in communication with on-demand transportation management systems, as described herein. In an example of FIG. 2, a control system 220 can autonomously operate the AV 200 in a given geographic region for a variety of purposes, including on-demand transport services (e.g., passenger transport, goods delivery, etc.). In examples described, the AV 200 can operate autonomously without human control. For example, the AV 200 can autonomously steer, accelerate, shift, brake, and operate lighting components. Some variations also recognize that the AV 200 can switch between an autonomous mode, in which the AV control system 220 autonomously operates the AV 200, and a manual mode in which a safety driver takes over manual control of the acceleration system 272, steering system 274, braking system 276, and lighting and auxiliary systems 278 (e.g., directional signals and headlights).

According to some examples, the control system 220 can utilize specific sensor resources in order to autonomously operate the AV 200 in a variety of driving environments and conditions. For example, the control system 220 can operate the AV 200 by autonomously operating the steering, acceleration, and braking systems 272, 274, 276 of the AV 200 to a specified destination. The control system 220 can perform vehicle control actions (e.g., braking, steering, accelerating) and route planning using sensor information, as well as other inputs (e.g., transmissions from remote or local human operators, network communication from other vehicles, etc.).

In an example of FIG. 2, the control system 220 includes computational resources (e.g., processing cores and/or field programmable gate arrays (FPGAs)) which operate to process sensor data received from a sensor system 202 of the AV 200 that provides a sensor view of a road segment upon which the AV 200 operates. The sensor data can be used to determine actions which are to be performed by the AV 200 in order for the AV 200 to continue on a route to the destination, or in accordance with a set of transport instructions received from network computing system 290. In some variations, the control system 220 can include other functionality, such as wireless communication capabilities using a communication interface 235, to send and/or receive wireless communications over one or more networks 285 with one or more remote sources. In controlling the AV 200, the control system 220 can generate commands to control the various control mechanisms 270 of the AV 200, including the vehicle's acceleration system 272, steering system 274, braking system 276, and auxiliary systems 278 (e.g., lights and directional signals).

The AV 200 can be equipped with multiple types of sensors 202 which can combine to provide a computerized perception, or sensor view, of the space and the physical environment surrounding the AV 200. Likewise, the control system 220 can operate within the AV 200 to receive sensor data from the sensor suite 202 and to control the various control mechanisms 270 in order to autonomously operate the AV 200. For example, the control system 220 can analyze the sensor data to generate low level commands executable by the acceleration system 272, steering system 274, and braking system 276 of the AV 200. Execution of the commands by the control mechanisms 270 can result in throttle inputs, braking inputs, and steering inputs that collectively cause the AV 200 to operate along sequential road segments according to a route plan.

In more detail, the sensor suite 202 operates to collectively obtain a live sensor view for the AV 200 (e.g., in a forward operational direction, or providing a 360-degree sensor view), and to further obtain situational information proximate to the AV 200, including any potential hazards or obstacles. By way of example, the sensors 202 can include multiple sets of camera systems 201 (video cameras, stereoscopic cameras or depth perception cameras, long range monocular cameras), LIDAR systems 203, one or more radar systems 205, and various other sensor resources such as sonar, proximity sensors, infrared sensors, and the like. According to examples provided herein, the sensors 202 can be arranged or grouped in a sensor system or array (e.g., in a sensor pod mounted to the roof of the AV 200) comprising any number of LIDAR, radar, monocular camera, stereoscopic camera, sonar, infrared, or other active or passive sensor systems.

Each of the sensors 202 can communicate with the control system 220 utilizing a corresponding sensor interface 210, 212, 214. Each of the sensor interfaces 210, 212, 214 can include, for example, hardware and/or other logical components which are coupled or otherwise provided with the respective sensor. For example, the sensors 202 can include a video camera and/or stereoscopic camera system 201 which continually generates image data of the physical environment of the AV 200. The camera system 201 can provide the image data for the control system 220 via a camera system interface 210. Likewise, the LIDAR system 203 can provide LIDAR data to the control system 220 via a LIDAR system interface 212. Furthermore, as provided herein, radar data from the radar system 205 of the AV 200 can be provided to the control system 220 via a radar system interface 214. In some examples, the sensor interfaces 210, 212, 214 can include dedicated processing resources, such as provided with field programmable gate arrays (FPGAs) which can, for example, receive and/or preprocess raw image data from the camera sensor.

In general, the sensor systems 202 collectively provide sensor data to a perception engine 240 of the control system 220. The perception engine 240 can access a database 230 comprising stored localization maps 232 of the transport service region in which the AV 200 operates. As provided herein, the localization maps 232 can comprise highly detailed ground truth data of each road segment of the transport service region throughout which the AV operates. For example, the localization maps 232 can comprise pre-recorded data (e.g., sensor data including image data, LIDAR data, and the like) by specialized mapping vehicles or other AVs with recording sensors and equipment, and can be processed to pinpoint various objects of interest (e.g., traffic signals, road signs, and other static objects). As the AV 200 travels along a given route, the perception engine 240 can access a current localization map of a current road segment to compare the details of the current localization map with the real-time sensor data in order to detect and classify any objects of interest, such as moving vehicles, pedestrians, bicyclists, and the like.

In various examples, the perception engine 240 can dynamically compare the live sensor data from the AV's sensor systems 202 to the current localization map as the AV 200 travels through a corresponding road segment. The perception engine 240 can identify and classify any objects of interest in the live sensor data that can indicate a potential hazard. In accordance with many examples, the perception engine 240 can provide object of interest data to a prediction engine 245 of the control system 220, wherein the objects of interest in the object of interest data indicates each classified object that can comprise a potential hazard (e.g., a pedestrian, bicyclist, unknown objects, other vehicles, etc.).

Based on the classification of the objects in the object of interest data, the prediction engine 245 can predict a path of each object of interest and determine whether the AV control system 220 should respond or react accordingly. For example, the prediction engine 240 can dynamically calculate a collision probability for each object of interest, and generate event alerts if the collision probability exceeds a certain threshold. As described herein, such event alerts can be processed by the vehicle control module 255 and/or the route planning engine 260, along with a processed sensor view indicating the classified objects within the live sensor view of the AV 200. The vehicle control module 255 can then generate control commands executable by the various control mechanisms 270 of the AV 200, such as the AV's acceleration, steering, and braking systems 272, 274, 276. In certain examples, the route planning engine 260 can determine an immediate, low level trajectory and/or higher-level plan for the AV 200 based on the event alerts and processed sensor view (e.g., for the next 100 meters or up to the next intersection).

On a higher level, the AV control system 220 can include a route planning engine 260 that provides the vehicle control module 255 with a route plan to a given destination, such as a pick-up location, a drop off location, or other destination within the transport service region. In various aspects, the route planning engine 260 can generate the route plan based on transport instructions received from the network computing system 290 over one or more networks 285. According to examples described herein, the AV 200 can include a location-based resource, such as a positioning module 222 (e.g., a GPS module), that provides location data (e.g., periodic location pings) to the network computing system 290 over the network(s) 285. Based on the AV's 200 location data, the network computing system 290 may select the AV 200 to service a particular transport request.

According to some implementations, the control system 220 can receive the localization maps 232 from the network computing system 290. For example, the network computing system 290 can transmit an updated localization map 232 to the communication interface 235 over the network(s) 285 to replace a stale localization map in the database 230. For example, the updated localization map can comprise metadata comprising a targeted label of a road anomaly on the road segment represented by the localization map. Additionally or alternatively, the updated localization map can include metadata indicating the devised resolution response to the road anomaly, as described herein.

In certain examples, the control system 220 can transmit or stream AV sensor log data to the network computing system 290. In various examples, the sensor log data can comprise inertial measurement unit (IMU) data from one or more on-board IMUs 223, which can indicate acceleration forces experienced by the AV 200 when encountering road anomalies. The sensor log data can enable the network computing system 290 to identify any matches with road anomaly signatures, as described herein. According to various examples, the control system 220 can receive a resolution response to perform one or more actions to resolve the road anomaly. For example, the control system 220 can be instructed to ignore the anomaly, adjust a speed of the AV 200, reroute or take a detour, change lanes, adjust a lane position, etc.

In some aspects, the AV control system 220 can operate in accordance with a set of safety standards, such as certainty probabilities with respect to object detection, classification, and/or path prediction. Accordingly, when these certainty probabilities are not met, the AV control system 220 can enter a stuck state or drop out of autonomy, unable to progress further. Such stuck states may be caused by an indeterminate object, such as a plastic bag in front of the AV 200, or a significant occlusion in the AV's sensor view (e.g., a parked truck blocking a field of view of the sensor systems 202). Such stuck states may further be caused by instances of high acceleration, indicative of a collision. For example, these stuck states may be triggered due to the AV striking potholes, road bumps, depressions, uneven rail tracks, large cracks, and the like.

According to examples described herein, the communication interface 235 can receive resolution responses to the road anomalies that enable the control system 220 to preemptively respond to the road anomalies. Such resolution responses can comprise an updated localization map, a reroute command, a lane or positioning adjustment command, and the like. In one aspect, the resolution response causes the AV to transition into a teleassistance mode that establishes a control link that enables a remote human operator to decide an action to overcome the road anomaly (e.g., ignore, a speed adjustment, a positioning adjustment, a detour, etc.).

It is contemplated that the resolution responses to road anomalies can enable the AV 200 to preemptively avoid road anomaly impacts. In some aspects, the AV 200 and/or the network computing system 290 can report road anomalies to a central public works resource. For example, a road anomaly that causes AVs to drop out of autonomy mode may be automatically reported. The interactions between the AV 200, as a part of the fleet of AVs 185 described with respect to FIG. 1, and the network computing system 290 can allow for reduced road anomaly impacts, fewer misalignment and or tire incidences, significant reduction in autonomous mode drop-off events, and reduced operational costs for the AV fleet 185.

Methodology

In the below description of the flow charts of FIGS. 3 and 4, reference may be made to reference characters representing like features as shown and described with respect to FIGS. 1 and 2. Furthermore, the processes described in connection with FIGS. 3 and 4 may be performed by an example network computing system 100, 290 as shown and described with respect to FIGS. 1 and 2. Still further, the processes in the flow charts of FIGS. 3 and 4 need not be performed in the order shown, but rather may be performed in any suitable order.

Figure 3:
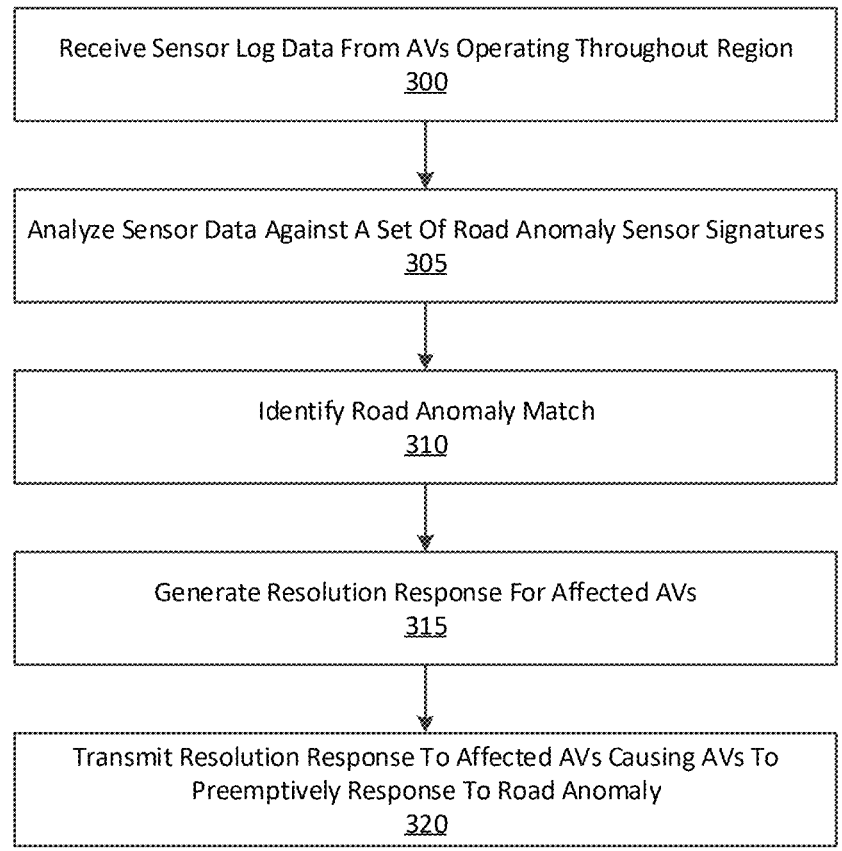
FIG. 3 is a flow chart describing an example method of coordinating autonomous vehicles within a transport service region, according to examples described herein.

FIG. 3 is a flow chart describing an example method of coordinating autonomous vehicles within a transport service region, according to examples described herein. In various examples, the network computing system 100 can receive sensor log data from AVs 187 operating throughout a transport service region (300). As described herein, the sensor log data can include accelerometer data indicating forces experienced by the AV 187 when impact road anomalies, such as potholes, rail tracks, road gutters and cracks, and the like. The network computing system 100 can analyze the sensor log data against a set of road anomaly signatures corresponding to known road anomalies (305).

In certain implementations, the network computing system 100 can generate a resolution response for affected AVs that are on current routes that will cause the AVs to impact or otherwise make contact with the road anomaly (315). The network computing system 100 may then transmit the resolution response to the affected AVs to enable the AVs to preemptively response to the road anomaly (320). For example, the resolution response can comprise an instruction for an AV to reduce speed to mitigate the acceleration forces cause by surmounting the road anomaly. Alternatively, the resolution response can comprise an instruction for the AV to adjust a lane position, change lanes, or take a detour to avoid impacting the road anomaly.

Figure 4:
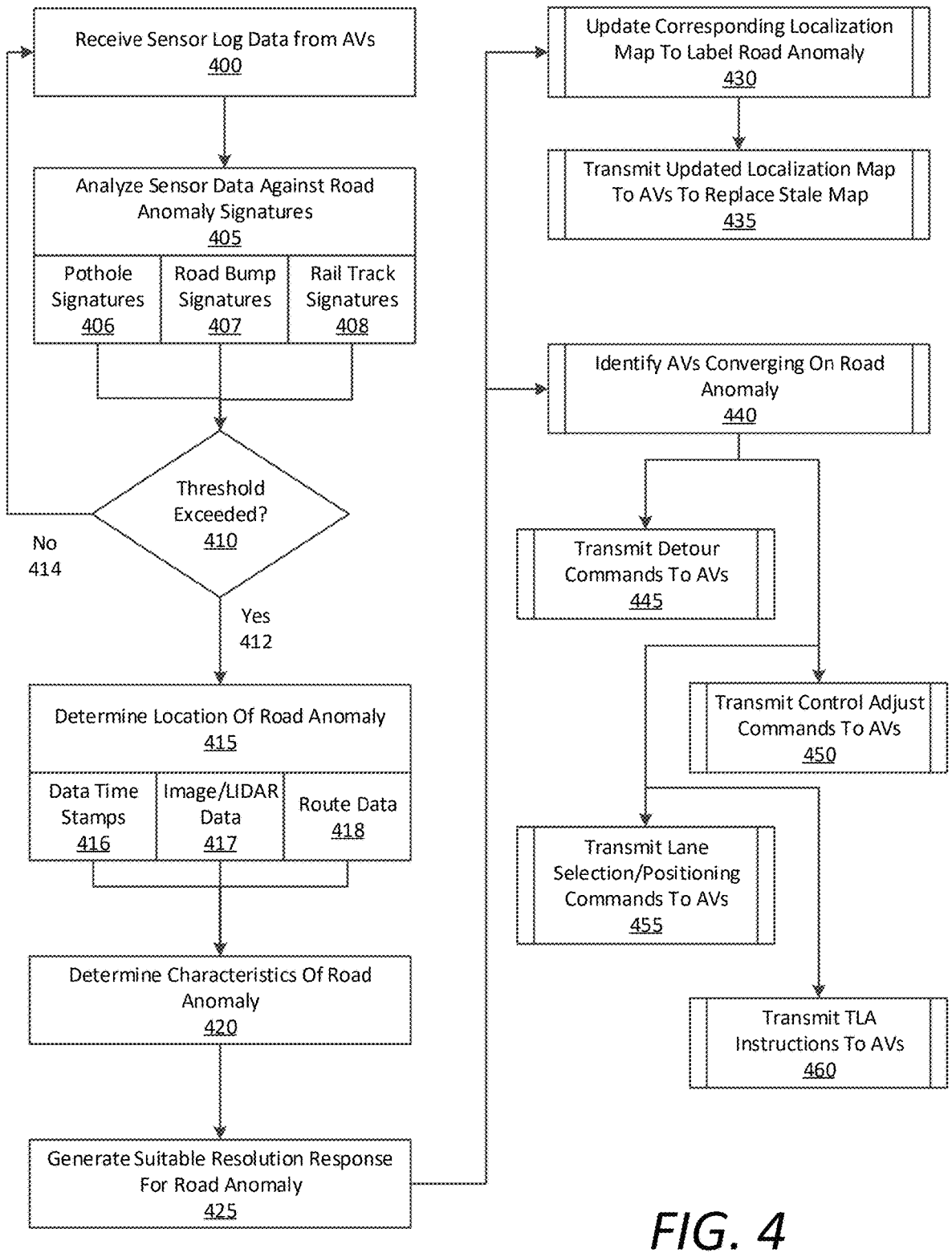
FIG. 4 is another a flow chart describing an example method of coordinating autonomous vehicles within a transport service region, according to examples described herein.

FIG. 4 is a more detailed a flow chart describing an example method of coordinating autonomous vehicles within a transport service region, according to examples described herein. Referring to FIG. 4, the network computing system 100 can receive sensor log data from a fleet of AVs 185 operating throughout a transport service region (400). In various examples, the network computing system 100 can analyze the sensor data against road anomaly signatures (405). For example, the network computing system 100 can compare the sensor data to pothole signature (e.g., accelerometer data indicating a pothole impact) (406), road bump signatures (e.g., road gutters, cracks, rough roads, etc.) (407), and/or rail track signatures (408).

According to examples described herein, the network computing system 100 can determine whether an acceleration threshold is exceeded (410). In certain examples, the threshold can correspond to an experienced acceleration at which the AV 187 drops out of an autonomous mode and/or enters a manual, safety, or teleassistance mode. In variations, the acceleration threshold can comprise a threshold configured to prevent damage to vehicle components, such as on-board processors, tires, and alignment (e.g., caster, camber, and toe angle). If the threshold is not exceeded (414), then the network computing system 100 can continue to receive and analyze sensor log data from the AVs 187 of the fleet 185 (400), (405).

If the acceleration threshold is exceeded (412), then the network computing system 100 can determine the location of the road anomaly (415). For example, the network computing system 100 can determine the location by identifying data time stamps of the sensor log data (416), image and/or LIDAR data that directly identify the road anomaly (417), and/or route data of the AV 187 to correlate to the data time stamps (418). In various examples, the network computing system 100 can further determine characteristics of the road anomaly (420). For example, the network computing system 100 can classify the road anomaly in terms of type, severity, size, and the like. Based on the characteristics of the road anomaly, the network computing system 100 can generate a suitable resolution response that enables the AVs to mitigate or avoid the road anomaly (425).

In certain implementations, the network computing system 100 can update a localization map that corresponds to a road segment on which the road anomaly is located to label the road anomaly (430). For example, the network computing system 100 can mark the specific location of the road anomaly on the localization map, and label the anomaly with metadata that comprise the resolution response (e.g., adjust lane position, change lanes, adjust speed, etc.) (430). The network computing system 100 may then transmit the updated localization map including the targeted label of the road anomaly to the AVs 187 of the fleet 185 to replace the previous, stale localization map (435).

In variations, the network computing system 100 can dynamically identify AVs on current routes that are converging on the road anomaly (440). Based on the nature and characteristics of the road anomaly, the network computing system 100 can configure and transmit the resolution response to those targeted AVs. For example, the network computing system 100 can transmit a resolution response comprising a detour command to the AVs, which causes the AVs to detour around the road anomaly (445). In certain examples, the network computing system 100 can transmit resolution response comprising a control adjustment command, instructing the AVs to reduce its speed or to perform a maneuver prior to impacting the road anomaly (450).

In further variations, the network computing system 100 can transmit a resolution response comprising lane selection or lane positioning commands that instruct the AVs to switch lanes or adjust a lane position to avoid the road anomaly (455). In still further implementations, the network computing system 100 can transmit a resolution response comprising teleassistance instructions to instruct the AVs to request remote teleassistance prior to arriving at the road anomaly (460). As described herein, remote teleassistance communication can enable a remote human operator to decide how to approach or avoid the road anomaly. For example, the remote human operator can select a motion plan from a number of motion plan options to cause the AV 187 to overcome the road anomaly.

It is further contemplated that the resolution responses may be individually tailored based on the vehicle characteristics of the AV 187. For example, a sport utility vehicle or pick-up truck may have increased tolerances for road anomalies than normal cars. Thus, the network computing system 100 can configure differing sets of resolution responses depending on the vehicle type and/or vehicle dimensions.

Hardware Diagrams

Figure 5:
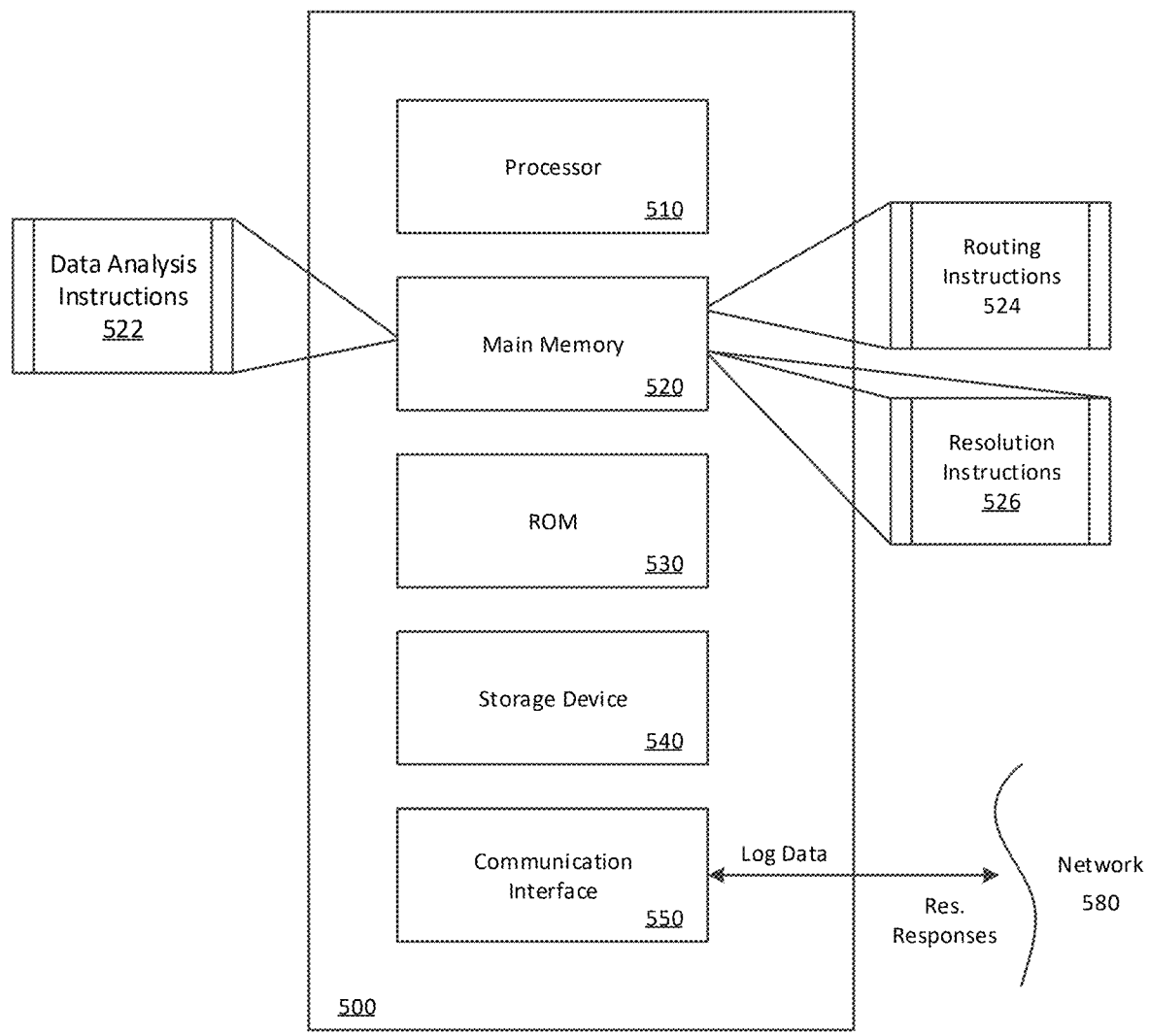
FIG. 5 is a block diagram that illustrates a computer system upon which example network computing systems described herein may be implemented.

FIG. 5 is a block diagram that illustrates a computer system upon which examples described herein may be implemented. A computer system 500 can be implemented on, for example, a server or combination of servers. For example, the computer system 500 may be implemented as part of a network service, such as described in FIGS. 1 through 4. In the context of FIG. 1, the network computing system 100 may be implemented using a computer system 500 such as described by FIG. 5. The computer system 100 and may also be implemented using a combination of multiple computer systems as described in connection with FIG. 5.

In one implementation, the computer system 500 includes processing resources 510, a main memory 520, a read-only memory (ROM) 530, a storage device 540, and a communication interface 550. The computer system 500 includes at least one processor 510 for processing information stored in the main memory 520, such as provided by a random-access memory (RAM) or other dynamic storage device, for storing information and instructions which are executable by the processor 510. The main memory 520 also may be used for storing temporary variables or other intermediate information during execution of instructions to be executed by the processor 510. The computer system 500 may also include the ROM 530 or other static storage device for storing static information and instructions for the processor 510. A storage device 540, such as a magnetic disk or optical disk, is provided for storing information and instructions.

The communication interface 550 enables the computer system 500 to communicate with one or more networks 580 (e.g., cellular network) through use of the network link (wireless or wired). Using the network link, the computer system 500 can communicate with one or more computing devices, one or more servers, one or more databases, and/or one or more self-driving vehicles. In accordance with examples, the computer system 500 receives requests 582 from mobile computing devices of individual users. The executable instructions stored in the memory 530 can include data analysis instructions 522, routing instructions 524, and resolution instructions 526.

The executable instructions stored in the memory 520 can also include transform instructions 522, which enable the computer system 500 to access profiles 526 of users and/or transport vehicles in order to determine boarding time estimates for users that are located in an indoor environment. By way of example, the instructions and data stored in the memory 520 can be executed by the processor 510 to implement an example computing system 100 of FIG. 1. The processor 510 is configured with software and/or other logic to perform one or more processes, steps and other functions described with implementations, such as described by FIGS. 1 to 4, and elsewhere in the present application.

Examples described herein are related to the use of the computer system 500 for implementing the techniques described herein. According to one example, those techniques are performed by the computer system 500 in response to the processor 510 executing one or more sequences of one or more instructions contained in the main memory 520. Such instructions may be read into the main memory 520 from another machine-readable medium, such as the storage device 540. Execution of the sequences of instructions contained in the main memory 520 causes the processor 510 to perform the process steps described herein. In alternative implementations, hard-wired circuitry may be used in place of or in combination with software instructions to implement examples described herein. Thus, the examples described are not limited to any specific combination of hardware circuitry and software.

Figure 6:
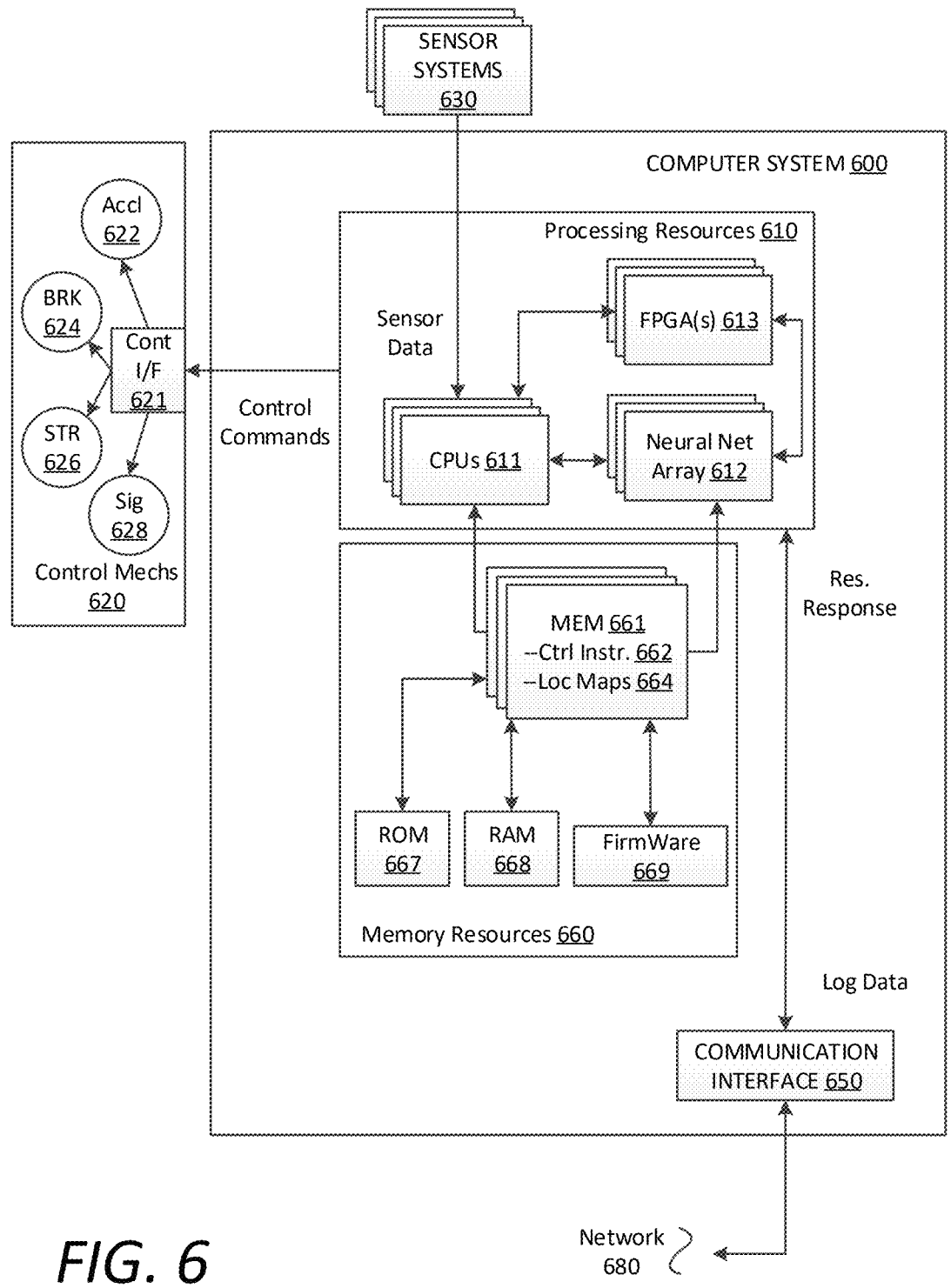
FIG. 6 is a block diagram that illustrates a computer system upon which example autonomous control systems described herein may be implemented.

FIG. 6 is a block diagram illustrating a computer system upon which example AV processing systems described herein may be implemented. The computer system 600 can be implemented using a number of processing resources 610, which can comprise computer processing units (CPUs) 611 and field programmable gate arrays (FPGAs) 613. In some aspects, any number of processors 611 and/or FPGAs 613 of the computer system 600 can be utilized as components of a neural network array 612 implementing a machine learning model and utilizing road network maps stored in memory 661 of the computer system 600. In the context of FIG. 2, various aspects and components of the AV control system 220 can be implemented using one or more components of the computer system 600 shown in FIG. 6.

According to some examples, the computer system 600 may be implemented within an autonomous vehicle (AV) with software and hardware resources such as described with examples of FIG. 2. In an example shown, the computer system 600 can be distributed spatially into various regions of the AV, with various aspects integrated with other components of the AV itself. For example, the processing resources 610 and/or memory resources 660 can be provided in a cargo space of the AV. The various processing resources 610 of the computer system 600 can also execute control instructions 662 using microprocessors 611, FPGAs 613, a neural network array 612, or any combination of the foregoing.

In an example of FIG. 6, the computer system 600 can include a communication interface 650 that can enable communications over a network 680. In one implementation, the communication interface 650 can also provide a data bus or other local links to electro-mechanical interfaces of the vehicle, such as wireless or wired links to and from control mechanisms 620 (e.g., via a control interface 621), sensor systems 630, and can further provide a network link to a backend transport management system or a remote teleassistance system (implemented on one or more datacenters) over one or more networks 680.

The memory resources 660 can include, for example, main memory 661, a read-only memory (ROM) 667, storage device, and cache resources. The main memory 661 of memory resources 660 can include random access memory (RAM) 668 or other dynamic storage device, for storing information and instructions which are executable by the processing resources 610 of the computer system 600. The processing resources 610 can execute instructions for processing information stored with the main memory 661 of the memory resources 660. The main memory 661 can also store temporary variables or other intermediate information which can be used during execution of instructions by the processing resources 610. The memory resources 660 can also include ROM 667 or other static storage device for storing static information and instructions for the processing resources 610. The memory resources 660 can also include other forms of memory devices and components, such as a magnetic disk or optical disk, for purpose of storing information and instructions for use by the processing resources 610. The computer system 600 can further be implemented using any combination of volatile and/or non-volatile memory, such as flash memory, PROM, EPROM, EEPROM (e.g., storing firmware 669), DRAM, cache resources, hard disk drives, and/or solid-state drives.

The memory 661 may also store localization maps 664 in which the processing resources 610—executing control instructions 662—continuously compare to sensor data 632 from the various sensor systems 630 of the AV. Execution of the control instructions 662 can cause the processing resources 610 to generate control commands 615 in order to autonomously operate the AV's acceleration 622, braking 624, steering 626, and signaling systems 628 (collectively, the control mechanisms 620). Thus, in executing the control instructions 662, the processing resources 610 can receive sensor data 632 from the sensor systems 630, dynamically compare the sensor data 632 to a current localization map 664, and generate control commands 615 for operative control over the acceleration, steering, and braking of the AV along a particular route plan based on transport instructions 682 received from an on-demand transportation management system over the network 680. The processing resources 610 may then transmit the control commands 615 to one or more control interfaces 621 of the control mechanisms 620 to autonomously operate the AV along an autonomy route indicated in transport instructions, as described throughout the present disclosure.

The computer system 600 can transmit log data corresponding to at least one of the sensor data 632 telemetry, and/or diagnostics data from the vehicle's electronic control unit to the network computing system 100 over the network 680, and receive resolution responses according to the examples described herein.

It is contemplated for examples described herein to extend to individual elements and concepts described herein, independently of other concepts, ideas or systems, as well as for examples to include combinations of elements recited anywhere in this application. Although examples are described in detail herein with reference to the accompanying drawings, it is to be understood that the concepts are not limited to those precise examples. As such, many modifications and variations will be apparent to practitioners skilled in this art. Accordingly, it is intended that the scope of the concepts be defined by the following claims and their equivalents. Furthermore, it is contemplated that a particular feature described either individually or as part of an example can be combined with other individually described features, or parts of other examples, even if the other features and examples make no mentioned of the particular feature. Thus, the absence of describing combinations should not preclude claiming rights to such combinations.

What is claimed is:

1. A network computing system comprising:
   one or more processors; and
   a memory storing instructions that, when executed by the one or more processors, cause the network computing system to:
   receive sensor log data from one or more first autonomous vehicles (AVs) operating throughout a transport service region;
   analyze the sensor log data against a set of road anomaly signatures;

based on analyzing the sensor log data against the set of road anomaly signatures, identify a road anomaly within the transport service region;

generate a resolution response for the road anomaly; and transmit the resolution response to one or more second AVs to cause the one or more second AVs to respond to the road anomaly;

wherein the resolution response comprises a targeted label on an updated localization map indicating the road anomaly, and wherein the executed instructions cause the network computing system to transmit the resolution response by transmitting the updated localization map, including the targeted label indicating the road anomaly, to the one or more second AVs.

2. The network computing system of claim 1, wherein each of the one or more second AVs stores a set of localization maps with which to dynamically compare real-time sensor data in order to autonomously operate throughout the transport service region, and wherein the updated localization map is configured to replace a corresponding prior localization map that does not include the targeted label.

3. The network computing system of claim 1, wherein the resolution response comprises a routing instruction causing the one or more second AVs to reroute around the road anomaly.

4. The network computing system of claim 3, wherein the executed instructions cause the network computing system to identify the one or more second AVs based on current routes being traveled by the one or more second AVs converging towards the road anomaly.

5. The network computing system of claim 4, wherein the routing instruction causes each of the one or more second AVs to perform at least one of (i) adjust a lane position to avoid the road anomaly, (ii) select an alternate lane to avoid the road anomaly, or (iii) execute a detour to avoid the road anomaly.

6. The network computing system of claim 1, wherein the resolution response comprises a control instruction causing each of the one or more second AVs to adjust its speed when approaching the road anomaly.

7. The network computing system of claim 1, wherein the set of road anomaly signatures comprises sensor data signatures for at least one of potholes, road bumps, road gutters, rail tracks, or road cracks.

8. The network computing system of claim 7, wherein the set of road anomaly signatures corresponds to accelerometer data signatures, and wherein the sensor log data comprises accelerometer data from one or more on-board inertial measurement units of the one or more first AVs.

9. The network computing system of claim 8, wherein the sensor log data comprises at least one of image data or LIDAR data indicating a location of the road anomaly on an underlying road.

10. The network computing system of claim 8, wherein the sensor log data comprises position data and time stamps enabling the network computing system to pinpoint a location of the road anomaly within the transport service region.

11. The network computing system of claim 1, wherein the resolution response comprises a mode switch instruction to switch each of the one or more second AVs into a teleassistance mode at a threshold distance from the road anomaly, the teleassistance mode causing a control link to a remote human operator that selects a motion plan to overcome the road anomaly.

12. The network computing system of claim 1, wherein the one or more second AVs comprise a subset of the one or more first AVs.

13. A non-transitory computer readable medium storing instructions that, when executed by one or more processors, cause the one or more processors to:

receive sensor log data from one or more first autonomous vehicles (AVs) operating throughout a transport service region;

analyze the sensor log data against a set of road anomaly signatures;

based on analyzing the sensor log data against the set of road anomaly signatures, identify a road anomaly within the transport service region;

generate a resolution response for the road anomaly; and transmit the resolution response to one or more second AVs to cause the one or more second AVs to respond to the road anomaly;

wherein the set of road anomaly signatures comprises sensor data signatures for at least one of potholes, road bumps, road gutters, rail tracks, or road cracks, wherein the set of road anomaly signatures corresponds to accelerometer data signatures, and wherein the sensor log data comprises accelerometer data from one or more on-board inertial measurement units of the one or more first AVs.

14. The non-transitory computer readable medium of claim 13, wherein the resolution response comprises a targeted label on an updated localization map indicating the road anomaly, and wherein the executed instructions cause the one or more processors to transmit the resolution response by transmitting the updated localization map, including the targeted label indicating the road anomaly, to the one or more second AVs.

15. The non-transitory computer readable medium of claim 14, wherein each of the one or more second AVs stores a set of localization maps with which to dynamically compare real-time sensor data in order to autonomously operate throughout the transport service region, and wherein the updated localization map is configured to replace a corresponding prior localization map that does not include the targeted label.

16. The non-transitory computer readable medium of claim 13, wherein the resolution response comprises a routing instruction causing the one or more second AVs to reroute around the road anomaly.

17. The non-transitory computer readable medium of claim 16, wherein the executed instructions cause the one or more processors to identify the one or more second AVs based on current routes being traveled by the one or more second AVs converging towards the road anomaly.

18. The non-transitory computer readable medium of claim 17, wherein the routing instruction causes each of the one or more second AVs to perform at least one of (i) adjust a lane position to avoid the road anomaly, (ii) select an alternate lane to avoid the road anomaly, or (iii) execute a detour to avoid the road anomaly.

19. A computer-implemented method of coordinating autonomous vehicles (AVs) within a transport service region, the method being performed by one or more processors and comprising:

receiving sensor log data from one or more first autonomous vehicles (AVs) operating throughout a transport service region;

analyzing the sensor log data against a set of road anomaly signatures;

based on analyzing the sensor log data against the set of road anomaly signatures, identifying a road anomaly within the transport service region;

generating a resolution response for the road anomaly; and transmitting the resolution response to one or more second AVs to cause the one or more second AVs to respond to the road anomaly;

wherein the resolution response comprises a mode switch instruction to switch each of the one or more second AVs into a teleassistance mode at a threshold distance from the road anomaly, the teleassistance mode causing a control link to a remote human operator that selects a motion plan to overcome the road anomaly.

* * * * *